UNITED STATES PATENT OFFICE.

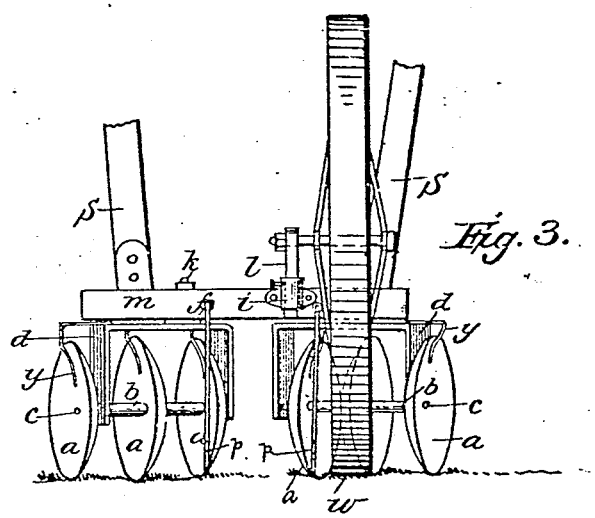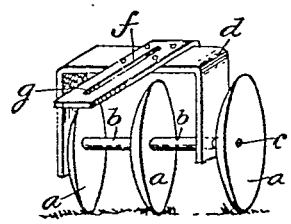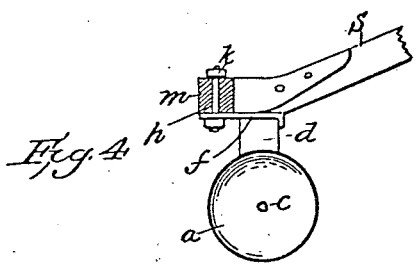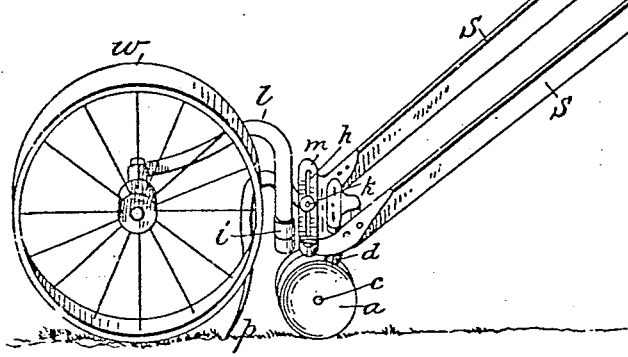

CARL F. VERMILLION, OF FORAKER, OHIO.

CULTIVATOR.

No. 895,214.  Specification of Letters Patent.  Patented Aug. 4, 1908.

Application filed February 12, 1907. Serial No. 357,064.

*To all whom it may concern:*

Be it known that I, CARL F. VERMILLION, a citizen of the United States, residing at Foraker, in the county of Hardin and State of Ohio, have invented certain new and useful Improvements in Cultivators, of which the following is a specification.

My invention relates to improvements in cultivators. Its objects are to provide for facilitating the cultivating, especially of onions and other vegetables, grown in a like manner; and to effect the same in a simple, economic and effective manner.

Said invention consists of certain structural features or instrumentalities substantially as hereinafter fully disclosed and specifically pointed out by the claims.

In the accompanying drawing illustrating the preferred embodiment of my invention— Figure 1 is a detached perspective view of one of the gangs and its carrying frame. Fig. 2 is a view in perspective. Fig. 3 is a view in front elevation. Fig. 4 is a detail of a fragmentary portion of the cultivator showing the beam in transverse section.

In the disclosure of my invention, I employ a suitable cross-beam $m$ to which are suitably bolted the guiding handles S and which beam has suitably connected thereto a single relatively broad-rimmed wheel $w$ arranged in advance of the plow-gangs and aiding the guiding of the machine, as is obvious. The connection between the beam $m$ and the wheel $w$, or rather its axle, is effected by means of a preferably curved bracket or arm $l$ having its forward end suitably fixed to said axle, at one end, laterally of said wheel; the inner end of said arm being inserted and retained in relatively fixed position in a socket $i$ suitably secured to the beam $m$ at its forward side. To the underside of said beam are secured preferably two clips $f$ for connecting thereto two frames $d$ each carrying a gang of preferably three disk-plows $a$, the latter being concavo-convex in outline. These plows are arranged upon shafts or axles $c$ supported in the pendent end-portions of the frames $d$ and are held in position against longitudinal movement thereon by sleeves $b$ fitted upon said axles between said plows or disks. Said clips are suitably fixed transversely to the upper surface of said frames, each about centrally of its respective frame, and each is provided with a longitudinal slot $g$ through which is inserted a suitable nut-equipped bolt $k$ also passed through a longitudinal slot $h$ of the beam $m$. By means of this arrangement the plow-gangs may be set or adjusted so as to present the latter either convergently or divergently with relation to the forward end of the machine, according as to whether it may be desired to throw the soil and weeds away from the plants or vegetable-row, in that case leaving a ridge which may be readily weeded, or to throw the soil to the row, thus providing for what is commonly called banking the latter, the guiding wheel $w$ passing between the contiguous rows of plants or vegetables and the plow-gang carrying frames $d$ striding the same. In throwing the soil to the plants or rows, it will be understood that the plows have their concavities presented toward the plants or row and, in reversing this operation, the convexities of said plows are presented thereto.

A finger $p$, of which two are employed one occupying a position at each side of a row, is suitably fixed to the forward side of the beam $m$ and reaches down close to the surface, for lifting or upraising any interfering foliage clear of the line of travel of the disk or plow-gangs, as will be readily understood. Also suitably secured at their upper ends to the plow-gang equipped frames $d$ are cleaners $y$, preferably of steel-wire, arranged to provide for their engagement with the respective disks or plows for removing any adhering soil therefrom thus keeping them in effective operative condition.

This cultivator is exceedingly simple, economically manufactured, readily operated, and effective for its intended purpose, as well as adapted to carry out the same with facility and expedition.

I claim—

1. A cultivator comprising a slotted beam, handles secured thereto, gangs of cultivator disks, frames therefor, slotted clips on said frames, and means extending through the slots of the clips and beam for adjustably securing said clips to the beam whereby the gangs of the disks may be adjusted with respect to each other and relatively to the beam, and fingers secured to the beam on each side of a row.

2. A cultivator comprising gangs of plows, frames for said plows, a common beam for said plows, clip-plates having their rear ends fixed to said frames and their forward ends adjustably connected to said beam, handles, a guiding wheel, means of connection between said beam and said guiding wheel extending laterally of said wheel and having its rear end portion upstanding from and secured to the forward side of said beam.

3. A cultivator, comprising gangs of plows, frames having their pendent portions forming bearings for the axles of said plows, a common beam for said plows, clip-plates having their rear ends fixed to said frames and their forward ends adjustably connected to said beam, means for the manipulation of said beam and plows, a guiding wheel for the latter, means of connection between said beam and said guiding wheel extending laterally of said wheel and having its rear end portion upstanding from, and secured to the forward side of said beam.

4. A cultivator, comprising gangs of plows, frames for said plow-gangs with their pendent portions forming bearings for the axles of said plow-gangs, a common beam for said plows, clip-plates having their rear ends fixed to said frames and their forward ends adjustably connected to said beam, handles connected to said beam, a guiding wheel for said beam and plow-gang, and an arm effecting connection between said beam and the axle of said wheel, said arm upstanding from, and secured to the forward side of said beam at its rear end and having its forward end connected to said axle, laterally of said guiding wheel.

In testimony whereof I affix my signature, in presence of two witnesses.

CARL F. VERMILLION.

Witnesses:
  J. A. OGLESBEE,
  W. A. SHOEMAKER.